US009231825B2

(12) United States Patent
Sakamaki et al.

(10) Patent No.: US 9,231,825 B2
(45) Date of Patent: Jan. 5, 2016

(54) NETWORK MANAGEMENT APPARATUS, MANAGEMENT SERVER, CLIENT TERMINAL, AND CONTROL METHOD THEREOF

(75) Inventors: Hisashi Sakamaki, Yokohama (JP); Kouichi Mochizuki, Chigasaki (JP); Ahimusa Uchida, Nishitokyo (JP)

(73) Assignee: Canon Denshi Kabushiki Kaisha, Chichibu-shi, Saitama-ken (JP)

( * ) Notice: Subject to any disclaimer, the term of this patent is extended or adjusted under 35 U.S.C. 154(b) by 1177 days.

(21) Appl. No.: 11/269,644

(22) Filed: Nov. 9, 2005

(65) Prior Publication Data

US 2007/0282895 A1 Dec. 6, 2007

(30) Foreign Application Priority Data

Nov. 9, 2004 (JP) .................................. 2004-325592

(51) Int. Cl.
*G06F 15/173* (2006.01)
*H04L 12/24* (2006.01)
*H04L 29/06* (2006.01)

(52) U.S. Cl.
CPC ........ *H04L 41/0869* (2013.01); *H04L 41/0853* (2013.01); *H04L 41/082* (2013.01); *H04L 63/083* (2013.01)

(58) Field of Classification Search
USPC .................................. 709/217, 224, 225, 226
See application file for complete search history.

(56) References Cited

U.S. PATENT DOCUMENTS

| 2002/0130175 A1* | 9/2002 | Nakajima ...................... 235/379 |
| 2003/0056051 A1* | 3/2003 | Burke et al. .................. 710/302 |
| 2004/0015941 A1* | 1/2004 | Sekine .......................... 717/168 |
| 2004/0177270 A1* | 9/2004 | Little et al. .................... 713/200 |
| 2004/0210897 A1* | 10/2004 | Brockway et al. ............. 717/174 |
| 2005/0015624 A1* | 1/2005 | Ginter et al. .................. 713/201 |
| 2005/0044404 A1* | 2/2005 | Bhansali et al. .............. 713/200 |
| 2005/0078009 A1* | 4/2005 | Shalts et al. .................. 340/635 |
| 2005/0289385 A1* | 12/2005 | Nakaya ............................ 714/5 |

FOREIGN PATENT DOCUMENTS

| JP | 09-265394 A | 10/1997 |
| JP | 2002-014848 A | 1/2002 |
| JP | 2002-366525 A | 12/2002 |
| JP | A 2004-38232 | 2/2004 .............. G06F 11/34 |

OTHER PUBLICATIONS

Nakagomi et al., "Network & Telephony Station canolink4016ie", OKI Technical Review, No. 189, Oki Electric Industry Co., Ltd., vol. 69, No. 1, pp. 28-31, Nov. 1, 2002.*

(Continued)

*Primary Examiner* — Karen Tang
(74) *Attorney, Agent, or Firm* — Fitzpatrick, Cella, Harper & Scinto (57) ABSTRACT

Configuration information representing the configuration elements of a client PC or the like on a network is compared with initial configuration information. When the configuration information changes, it is determined whether the configuration is proper. If the configuration is improper, the function of a corresponding configuration element to the network is inhibited. This can prevent an unstable state of the system, leakage of information, and a decrease in reliability of the network system upon a change in network configuration.

11 Claims, 10 Drawing Sheets

(56) References Cited

OTHER PUBLICATIONS

K. Nakagomi et al., "Network & Telephony Station canolink4016ie", *OKI Technical Review*, No. 189, Oki Electric Industry Co., Ltd., vol. 69, No. 1, pp. 28-31 (Nov. 1, 2002).

English-language translation of "Network & Telephony Station canolink4016ie".
Japanese Office Action, dated Nov. 1, 2010, concerning Japanese Patent Application No. 2004-325592.
English-language translation of Japanese Office Action, dated Nov. 1, 2010, concerning Japanese Patent Application No. 2004-325592.

\* cited by examiner

| CLIENT PC_ID | HARDWARE CONFIGURATION INFORMATION | SOFTWARE CONFIGURATION INFORMATION |
|---|---|---|
| MOCHIZUKI | × × × × × × | × × × × × × |
| NAKAJIMA | × × × × × × | × × × × × × |
| ⋮ | ⋮ | ⋮ |
| | | |

NETWORK MANAGEMENT APPARATUS, MANAGEMENT SERVER, CLIENT TERMINAL, AND CONTROL METHOD THEREOF

FIELD OF THE INVENTION

The present invention relates to network control and management techniques effective for a computer network system.

BACKGROUND OF THE INVENTION

General-purpose information processing apparatuses (e.g., personal computers: to be simply referred to as PCs hereinafter) which are used in a company are connected to a LAN, share devices and files on the network, and use a client-server database.

For example, many client PCs can access data files held by a file server on a network.

Upon building a network system, it is important that each apparatus on the network operates stably and security is ensured.

For the latter problem, there is proposed a system in which the server monitors access by a client PC to a shared resource (e.g., Japanese Patent Laid-Open No. 2004-38232).

For the former problem, there are many application programs which can run on a PC, including business applications, freeware, and shareware. Some application programs normally run under an OS of a specific version, some have bugs and operate unstably, and some are not compatible with a specific application.

The proposed technique can inhibit access by a third party other than a user who possesses the access right, and can ensure security to a certain degree.

However, considering past data leakage troubles, the measure is not satisfactory because once the password is stolen, the network becomes substantially vulnerable. In other words, conventional techniques of maintaining security consider only the access right to a shared resource on a network, and do not consider any process after the shared resource is accessed. There is a need for a technique of limiting an output from a client PC to a removable storage device connected to it.

An application program necessary for business is naturally installed in a PC. It is practically difficult to inhibit installation of an application irrelevant to business and an application which may make the system unstable.

Especially in a company in which many PCs are installed, even the system administrator cannot inhibit installation of an application irrelevant to business and an application which may make the system unstable. When the system or a given PC becomes abnormal, the cause must be determined from both hardware and software, which puts a heavy burden on the administrator.

Client PCs which operate under various OSs may be connected to a network. Even if an original OS is common, the OS may be changed and used without permission. This makes the system unstable, and the reliability suffers.

SUMMARY OF THE INVENTION

It is an object of the present invention to provide a network system environment with high reliability where an improper situation of the network system can be found out from a change in network information.

It is another object of the present invention to limit a data output using an information processing apparatus (e.g., a computer) connected to a network.

It is still another object of the present invention to prevent indiscriminate installation of an application program in an information processing apparatus connected to a network.

It is still another object of the present invention to contribute to management of a network system which reduces the burden on the system administrator.

It is still another object of the present invention to provide a control method capable of, when an improper situation of a network system is found, quickly dealing with it.

In order to achieve the above objects, the present invention has, e.g., the following arrangement. That is, a network management apparatus comprising:

first acquisition means for acquiring information representing network configuration elements;

second acquisition means for acquiring again information representing network configuration elements; and determination means for determining from the pieces of information acquired by the first acquisition means and the second acquisition means whether a network configuration is proper.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings.

<Description of System Configuration>

Figure 1:
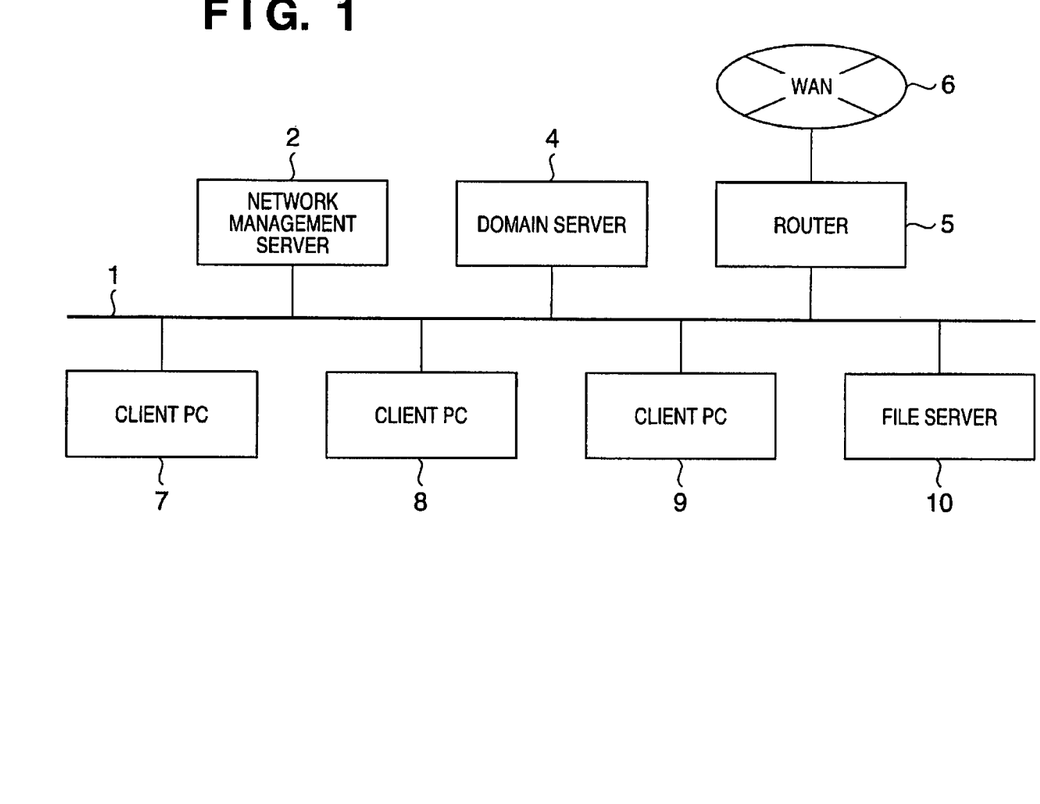
FIG. 1 is a block diagram showing a network system according to the first embodiment.

FIG. 1 is a block diagram showing a network system according to the first embodiment. In FIG. 1, reference numeral 1 denotes a network such as ETHERNET®. Reference numeral 2 denotes a network management server which incorporates an external storage device (e.g., hard disk) for storing a program for managing each client PC on a network, and configuration information (details of which will be described later) of each client PC. Reference numeral 4 denotes a domain server (to be also referred to as a domain controller) which manages a domain created on the network 1, and manages PCs and user names that can participate in the domain. Reference numeral 5 denotes a router for connecting an external WAN (including the Internet) 6. Reference numerals 7 to 9 denote client PCs; and 10, a file server.

Although a firewall and a device (e.g., network printer) may be connected in addition to the above configuration, they are not directly related to the present invention and a description thereof will be omitted. The domain server (to be also referred to as a domain controller) 4, router 5, and file server 10 have well-known configurations, and a description thereof will be omitted. The network management server 2, and client PCs 7 to 9 will be explained below.

<Network Management Server>

Figure 2:
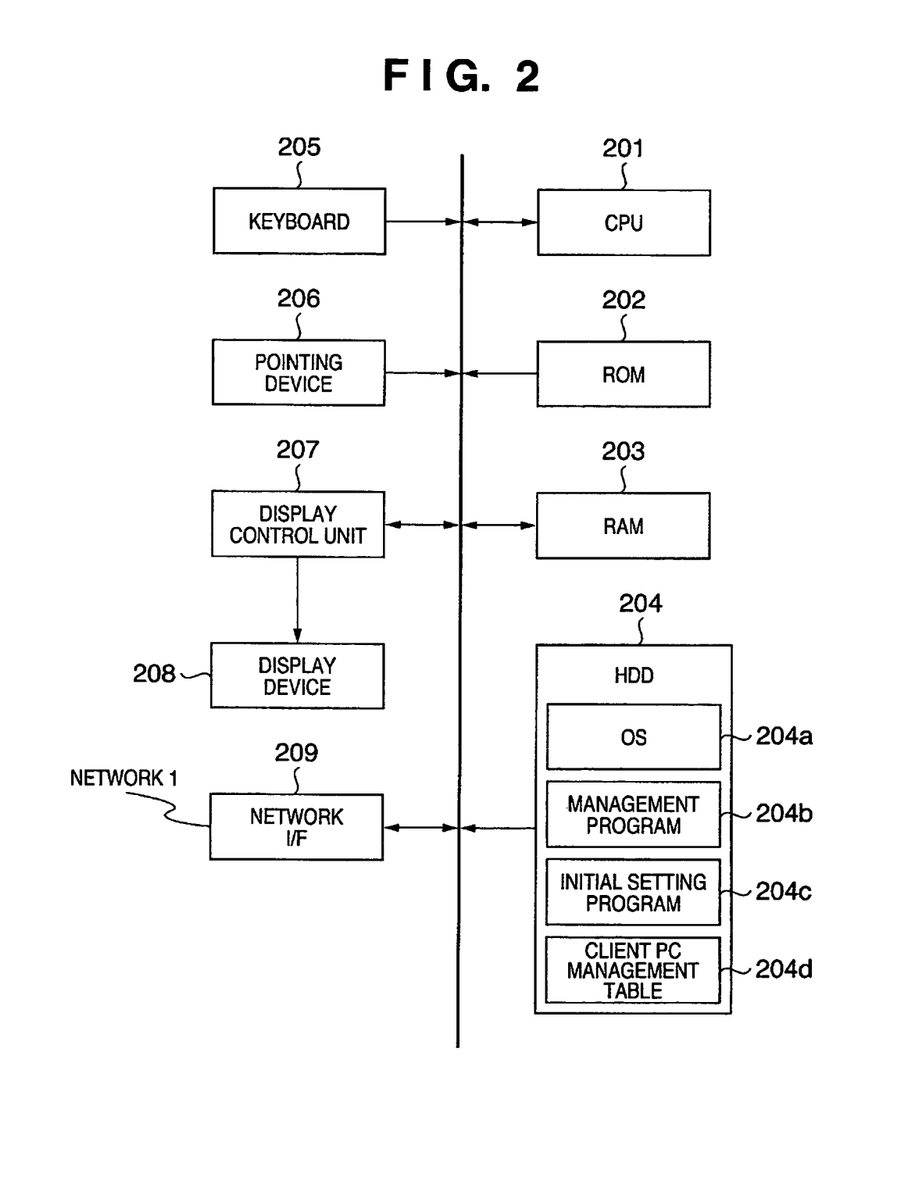
FIG. 2 is a block diagram showing a network management server according to the first embodiment.

FIG. 2 is a block diagram showing the network management server according to the first embodiment.

In FIG. 2, reference numeral 201 denotes a CPU which controls the overall apparatus; 202, a ROM which stores a boot program and BIOS; and 203, a RAM which is used as a work area for the CPU 201. An OS and server program are loaded into the RAM 203. Reference numeral 204 denotes a hard disk drive (HDD) which stores an OS 204a, management program 204b, initial setting program 204c, and client PC management table 204d (details of which will be described later), as shown in FIG. 2. Although the HDD 204 can store various data files in addition to these programs, a description thereof will be omitted.

Reference numeral 205 denotes a keyboard; and 206, a pointing device such as a mouse. Reference numeral 207 denotes a display control unit which incorporates a video memory, and a controller for, e.g., writing a bitmap image in accordance with an instruction from the CPU 201, reading out image data drawn in the video memory, and generating a predetermined video signal. Reference numeral 208 denotes a display device (e.g., CRT or LCD) which receives a video signal from the display control unit 207 and displays a corresponding image. Reference numeral 209 denotes a network interface which connects the network management server 2 to the network 1 to communicate with the network 1.

<Client PC>

Figure 4:
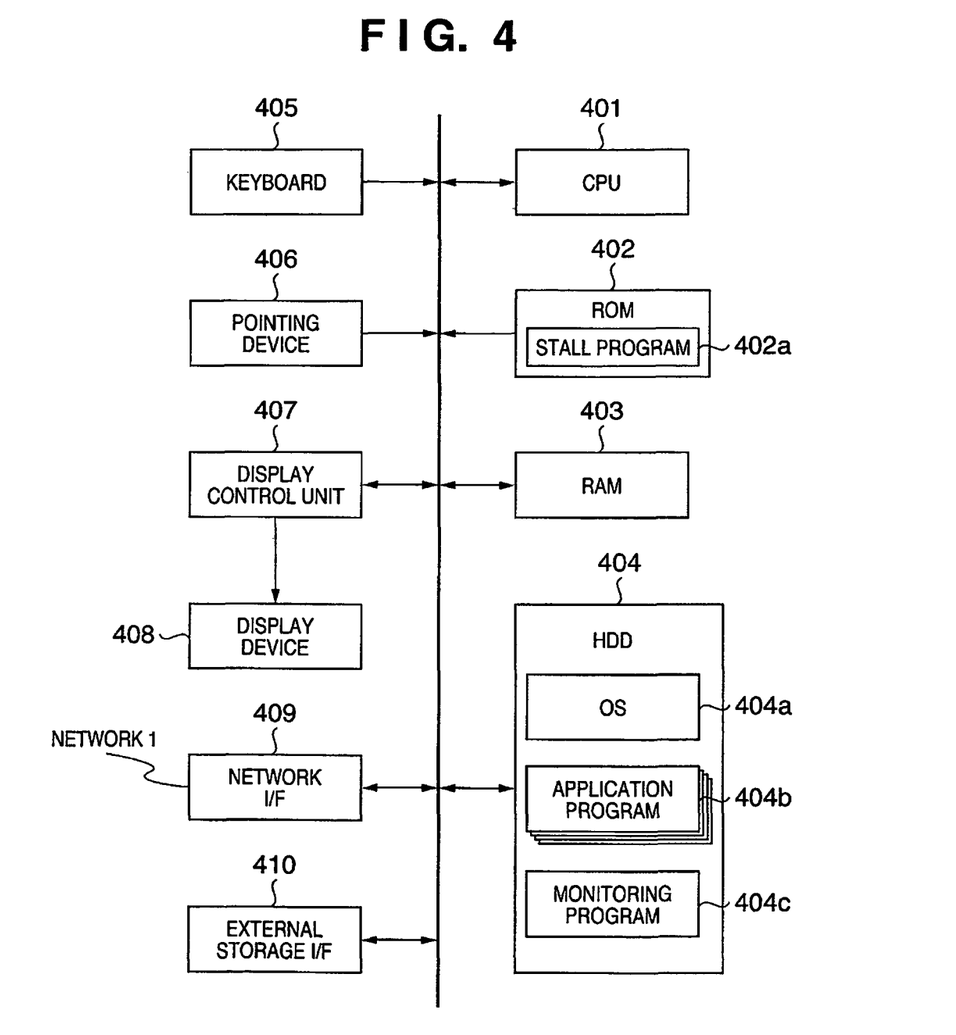
FIG. 4 is a block diagram showing a client PC according to the first embodiment.

FIG. 4 is a block diagram showing the client PC 7. The remaining client PCs 8 and 9 also have the same configuration.

In FIG. 4, reference numeral 401 denotes a CPU which controls the overall apparatus; and 402, a ROM which stores a boot program and BIOS. In addition to them, the ROM 402 stores a stall program (in the first embodiment, a power-off program) 402a for stopping the operation of the apparatus. The stall program is written in a machine language in order to execute the program by the CPU 401, and is an OS-independent program.

Reference numeral 403 denotes a RAM which is used as a work area for the CPU 401. An OS, a monitoring program according to the first embodiment, and various application programs are loaded into the RAM 403. Reference numeral 404 denotes a hard disk drive (HDD) which stores an OS 404a, various application programs 404b, and a monitoring program 404c (details of which will be described later), as shown in FIG. 4. Although the HDD 404 can store various data files in addition to these programs, a description thereof will be omitted.

Reference numeral 405 denotes a keyboard; 406, a pointing device; and 407, a display control unit. Reference numeral 408 denotes a display device (e.g., CRT or LCD) which receives a video signal from the display control unit 407 and displays a corresponding image. Reference numeral 409 denotes a network interface; and 410, an interface which can connect an external device and is, e.g., a USB interface in the first embodiment.

<Description of Outline>

Assume that, in installing a new client PC, the system administrator installs necessary software, then gives the client PC to the user, and permits connection to the network. Software to be installed includes the application program 404b which is indispensable to business, and the monitoring program 404c, as shown in FIG. 4. The monitoring program 404c is a program which is resident in the RAM 203 upon activation of the OS, and is so set as to run immediately after the OS is activated. All the client PCs 7 to 9 in FIG. 1 undergo this setting.

As described above, the management program 204b and initial setting program 204c have already been installed in the network management server 2.

In order to perform initial setting of security for the network 1, the administrator executes the initial setting program 204c (this work suffices to be performed once). Execution of the initial setting program 204c is designated with the keyboard 205, pointing device 206, or the like after the OS of the network management server 2 is activated.

The initial setting program 204c accesses the domain server 4, and acquires the client PC-IDs (machine names or user names on the network) of the client PCs 7 to 9 which can log in to the network 1. Based on the acquired client PC-IDs, the initial setting program 204c issues configuration information acquisition requests to the respective client PCs, and creates the client PC management table 204d in accordance with received information.

Figure 3:
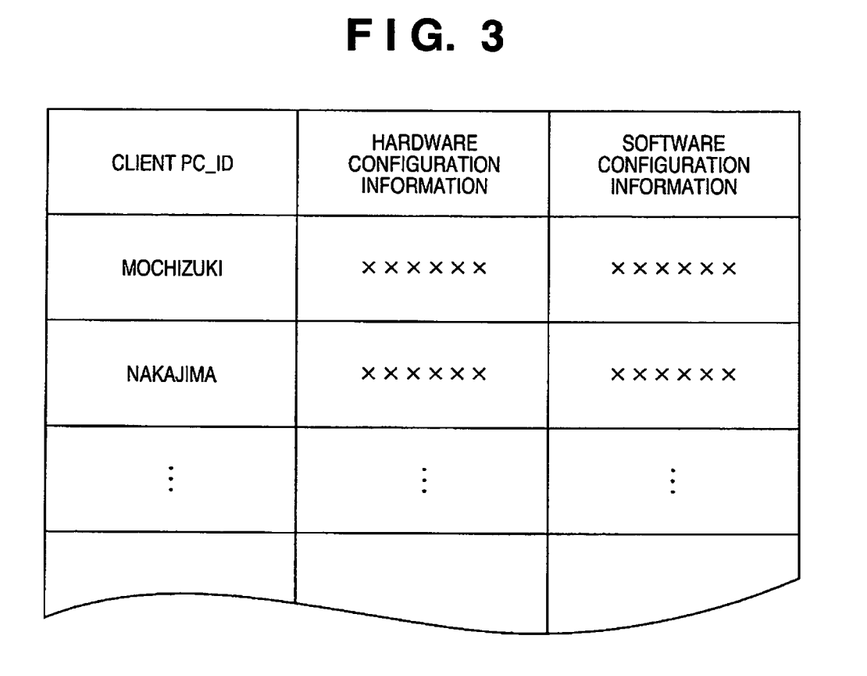
FIG. 3 is a table showing the data structure of a client PC management table which is stored and held in a network management server.

FIG. 3 shows an example of the created client PC management table 204d. As shown in FIG. 3, the first field stores a client PC-ID. The second and third fields respectively store information on hardware connected to the external storage interface 410 of a client PC, and software information representing an installed application.

The network management server 2 according to the first embodiment treats information created in the above manner in the client PC management table 204d as initial permissible configuration information of each client.

After that, if a change exceeding the permissible configuration information occurs in a client PC, the network management server 2 issues a stop instruction to the client PC in order to inhibit subsequent operation of the client PC.

The monitoring program 404c, the stall program 402a, and the initial setting program 204c and management program 204b in the network management server 2 which are executed upon activation of the client PC in order to implement the above process will be described.

<Description of Monitoring Program (Client PC)>

Figure 5:
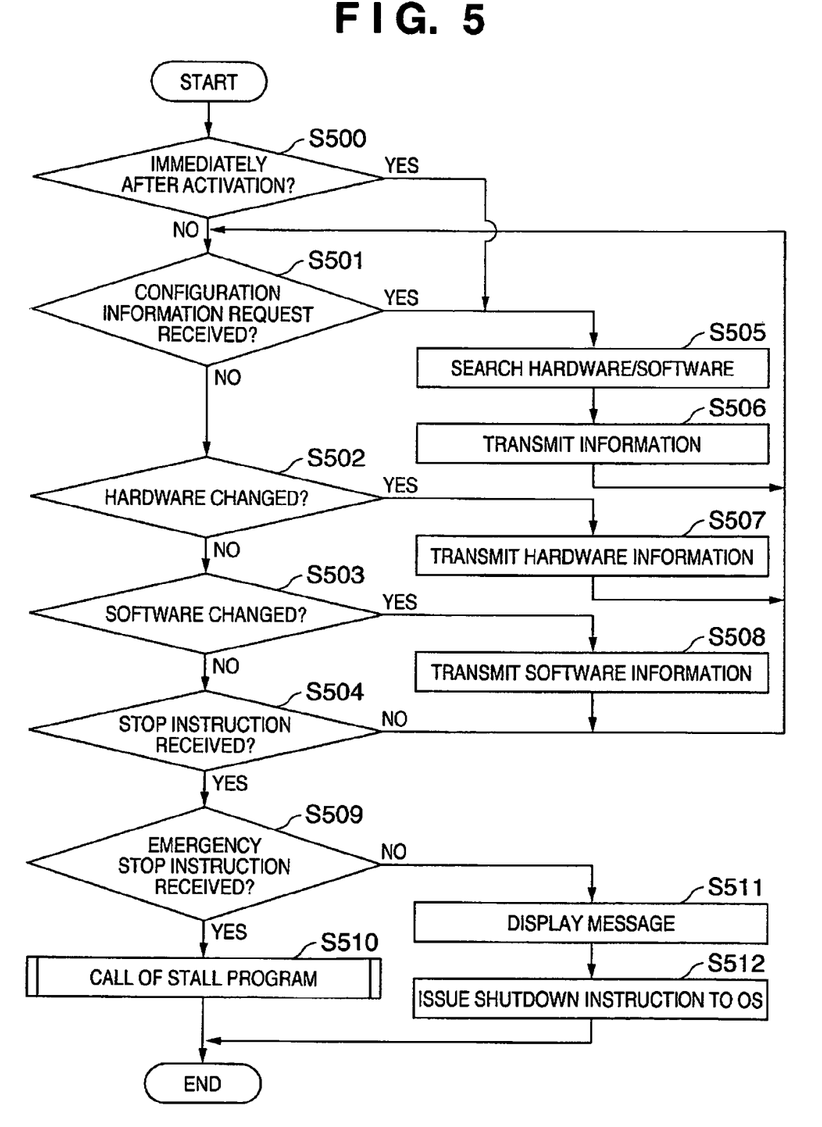
FIG. 5 is a flowchart showing the process sequence of a monitoring program which runs on the client PC.

FIG. 5 is a flowchart showing the process of the monitoring program 404c which runs on the client PC 7 (also in the client PCs 8 and 9) according to the first embodiment. As described above, the monitoring program is a memory-resident program which is automatically executed when the client PC 7 is powered on and the OS is normally activated. The monitoring program may fail to normally run when the OS is changed or another OS is read in from an external drive and executed.

Considering this situation, the monitoring program may be activated while or immediately after the BIOS is executed during power-on.

In step S500, it is determined whether the OS has just been activated. If NO in step S500, processes from step S501 are performed. Immediately after activation, the flow advances to step S505.

In steps S501 to S504, it is monitored whether a configuration information request instruction has been received from the network management server 2, whether hardware has changed upon disconnection/connection of a device from/to the external storage interface 410, whether installed software has changed, and whether a stop instruction has been received from the network management server 2. If the client PC 7 is in a normal state, neither a request nor instruction has been received, neither hardware nor software has changed, and thus the flow keeps looping from steps S501 to S504.

Note that recent OSs are of an event-driven type, and the above process may be executed after an event corresponding to steps S501 to S504 occurs. Alternatively, the process in FIG. 5 may be executed every predetermined cycle (e.g., about 5 sec) by timer interruption. In either case, the load on the CPU 401 of the client PC can be reduced in comparison with a case wherein the loop process continues.

If it is determined in step S501 that a configuration information request has been received from the network management server 2, the flow advances to step S505. In step S505, an application (accurately, an application program file name) currently installed in the client PC is searched for by referring to the registry or the like. Also, devices (among them, mass storage class devices) connected to the external storage interface 410 are searched for. In step S506, software information and hardware information (including the volume name of the mass storage device) which are obtained by search are converted into discriminative data formats, and sent back (transmitted) to the network management server 2. In this way, information transmitted in initial setting of the server is registered as the above-described "initial permissible configuration information".

If it is detected in step S502 that a device has been disconnected/connected from/to the external storage interface 410 (i.e., a device disconnection/connection event has occurred), the flow advances to step S507. In step S507, the current device configuration (if a device exists, including its device name and volume name) is converted into a predetermined data format, and the network management server 2 is notified of the device configuration (the device configuration is transmitted).

If it is determined in step S503 that an application has been added or deleted, the flow advances to step S508. In step S508, the current software configuration (if an application is added, including its application program file name) is converted into a predetermined data format, and the network management server 2 is notified of the software configuration (the software configuration is transmitted).

If it is determined in step S504 that a stop instruction has been received from the network management server 2, the flow advances to step S509 to determine whether the stop instruction is an emergency instruction (the first embodiment assumes two types of stop instructions).

The emergency stop instruction is issued when a change (addition) of hardware is not permitted, and the other stop instruction (to be referred to as a "normal stop instruction") is issued when a change (addition) of software is not permitted, details of which will be described later.

If it is determined that the stop instruction is an emergency instruction, the flow advances to step S510 to execute the stall program 402a stored in the ROM 402. If it is determined that the stop instruction is a normal stop instruction, for example, a message "the PC cannot operate unless the network cable is removed and the installed application is uninstalled" is displayed in step S511. In step S512, a request to execute a shutdown process is issued to the OS.

<Description of Stall Program (Client PC)>

Figure 6:
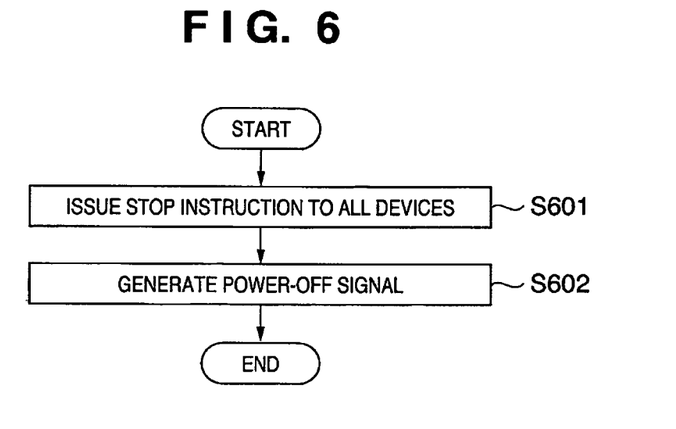
FIG. 6 is a flowchart showing the process sequence of a stall program which is stored in the ROM of the client PC.

The stall program is stored in the ROM 402 generally called a BIOS-ROM, and is an OS-independent program. FIG. 6 shows the process sequence of the stall program.

In step S601, a stop instruction (or reset instruction) is issued via the BIOS to all storage devices (including the internal HDD 404 and a storage device connected to the external storage interface 410) in order to prevent destruction to a file in the storage. The flow advances to step S602 to output a power-off signal to a predetermined signal line extending from a power supply (not shown).

<Description of Initial Setting Program (Network Management Server)>

Figure 7:
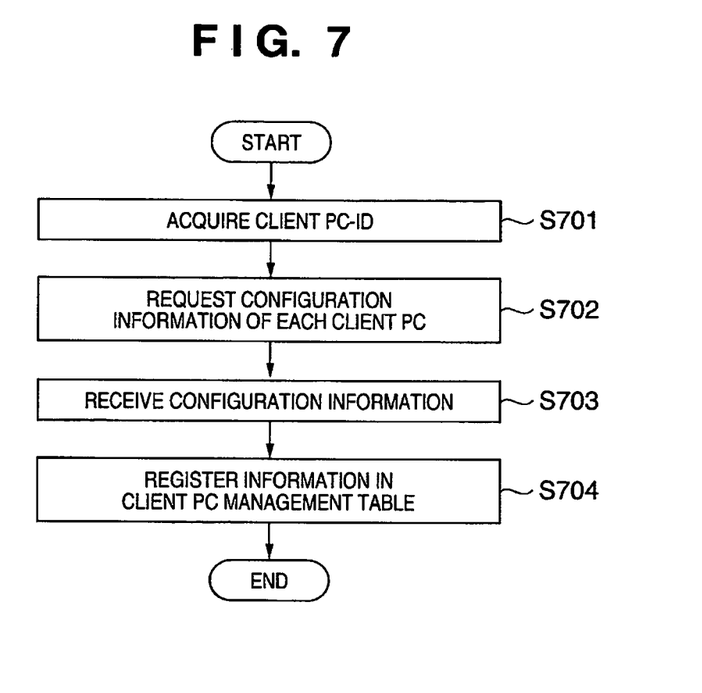
FIG. 7 is a flowchart showing the process sequence of the initial setting program of the network management server.

The initial setting program is executed in the network management server 2 by the administrator at a proper timing (e.g., when a network system is constructed). FIG. 7 shows the process contents of the initial setting program.

In step S701, the network management server 2 accesses the domain server 4 to acquire the client PC-IDs of all client PCs which are registered in the domain. In step S702, configuration information is requested of each client.

As a result, the client PC performs processes in steps S505 and S506 by the monitoring program 404c shown in FIG. 5. In step S703, the network management server 2 receives configuration information from each client PC. In step S704, each client PC-ID, hardware information, and software information are registered as the above-described "initial permissible configuration information" in the client PC management table.

<Description of Management Program (Network Management Server)>

Figure 8:
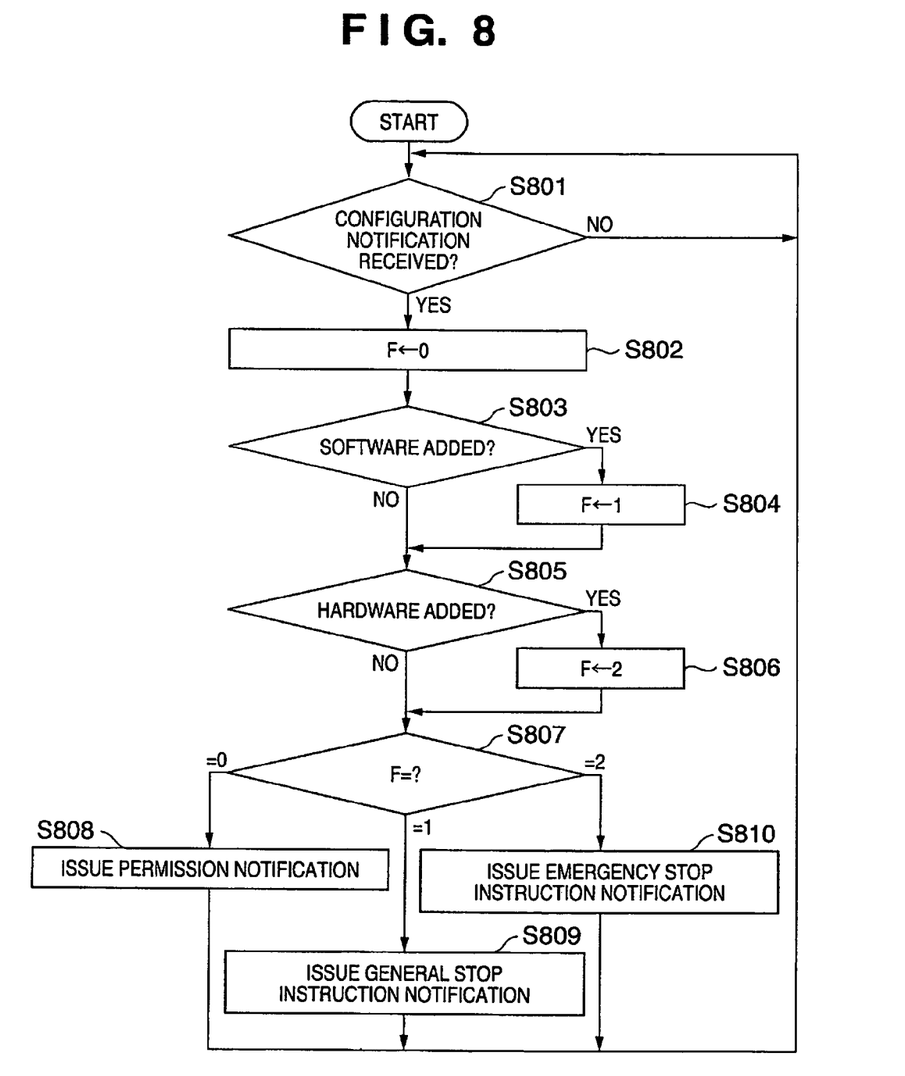
FIG. 8 is a flowchart showing the process sequence of the management program of the network management server.

The process contents of the management program 204b in the network management server 2 according to the first embodiment will be explained with reference to the flowchart of FIG. 8.

In step S801, it is determined whether each client PC notifies the network management server 2 of the configuration. This process corresponds to the transmission process in step S506 immediately after activation of the monitoring program 404c (FIG. 5) of the client PC, or the transmission process in step S507 or S508.

If the network management server 2 is notified of the configuration, the flow advances to step S802 to initialize to 0 a flag F which is ensured in advance in the RAM 203. If it is determined in step S803 that a software change notification has been received, it is determined whether an additional application program file name contained in the received notification information exists in "software information" of the notifying client PC in the client PC management table 204d. If it is determined that a configuration notification has been received in response to a request from the server, it is determined whether all application program file names contained in the received notification information exist in "software information" of the notifying client PC in the client PC management table 204d. If NO in step S803, the installed application may be irrelevant to business or make operation of the client PC unstable, and "1" is substituted into the flag F in step S804.

If it is determined in step S803 that no software information has changed, the flow advances to step S805. If it is determined in step S805 that a hardware change notification has been received, it is determined whether additional hardware information contained in the received notification information exists in "hardware information" of the notifying client PC in the client PC management table 204d. If it is determined that a configuration notification has been received in response to a request from the server, it is determined whether all pieces of hardware information contained in the received notification information exist in "hardware information" of the notifying client PC in the client PC management table 204d. If NO in step S805, confidential information may be written in a connected device, and thus "2" is substituted into the flag F in step S806. As a process prior to step S805 or S803, a client PC-ID, an address on the network, or the like may be compared with information of a registered client PC, and if it is detected that a client PC itself has newly been added, "2" may be substituted into the flag F, which will be described later.

In step S807, the content of the flag F is determined. For the flag F="0", a change of the configuration falls within the permissible range, and the network management server 2 notifies the client PC of a permission notification (step S808). For the flag F="1", the network management server 2 notifies the client PC of a normal stop instruction (step S809). For the flag F="2", the network management server 2 notifies the client PC of an emergency stop instruction (step S810).

The process contents of the client PC 7 (client PCs 8 and 9) and those of the network management server 2 according to the first embodiment have been described. By the above processes, the following operation effects can be obtained.

1. In a company in which many client PCs exist and a network has already been constructed, it is substantially impossible to check applications which have been installed in each client PC. However, each client PC can be regarded to operate stably at that time. The network management server 2 is installed, and the configuration of each client PC immediately before the initial setting program 204c is executed is approved to fall within the permissible range. Subsequent changes of software and hardware are limited. Consequently, the system administrator substantially performs maintenance only after the initial setting program 204c is executed, reducing the burden on the system administrator.

2. When an application exceeding the permissible range is installed, work using the client PC cannot be done unless the application is uninstalled. Thus, the system can be kept stable.

3. A power-off process is executed immediately when, e.g., an external storage device (e.g., flash memory device) which is not permitted is connected to the external storage interface 410. This can prevent external leakage of confidential information.

4. The monitoring program (FIG. 5) must be created for each OS which can be installed in a client PC. To the contrary, the stall program 402a is independent of the OS, and the burden on the programmer can be reduced.

The present invention has been exemplified by the server configuration in FIG. 3. The present invention can also be implemented by a network control type unit configuration that is mainly formed from hardware of the CPU 201 and software of the OS 204a, management program 204b, and initial setting program 204c. By using this unit system, a network system with high reliability can be easily constructed.

In the above embodiment, configuration information of a client has particularly been described. Similarly, configuration information of hardware and software in the domain server 4 and file server 10 can also be checked.

In the above description, configuration information of both hardware and software is checked by programs in the server and client. Depending on the application purpose of the system, the program can also be changed to check configuration information of either or both of hardware and software.

<Description of Modification>

In the first embodiment, a program for editing the client PC management table 204d created by the network management server 2 may be installed in the network management server 2. The editing program allows the administrator to perform editing such as a change of configuration information by using the keyboard 205 or the like, and register the edited configuration information again in the management table 204d. In order to allow only the administrator to activate the editing program, proper authentication (e.g., password collation or fingerprint collation) must be performed.

With this editing, the following settings can be made. For example, a client PC used by user A permits the use of a USB memory card. Upon a subsequent change of the user such as a personnel change or retirement of user A, the item of a USB memory card is deleted from hardware configuration information of the management table 204d to inhibit the use of a USB memory card. To the contrary, in order to exceptionally permit user B to install a given application, the application program file can be registered in software configuration information of the management table 204d. Further, when a new application is to be installed in all client PCs, the program can be registered as a permitted program regardless of the PC or user to execute installation in each terminal.

Assume that a client PC having the above-described monitoring program 404c is inhibited from connecting the client PC to a network due to replacement or a user change. At this time, even when the client PC is added to the network, it can be stopped in the above-described manner. When a client PC having no monitoring program 404c is added to the network, it may access a database on the network and collect data.

To prevent this, the management server 2 checks PC-specific address data (e.g., MAC address data: to be referred to as unique address data hereinafter) on the network 1, and can detect and inhibit access by the added PC.

More specifically, similar to FIG. 7, the management server 2 detects address data as unique address data of each connected client PC from data flowing through the network 1 upon network activation. The management server 2 registers the unique address data as network configuration information (not shown) in the client PC management table 204d of FIG. 3 in correspondence with each client PC.

Thereafter, when an added PC is connected to the network 1, powered on, and activated, the PC exchanges DHCP protocols for network participation setting with a DHCP server (not shown), and thus connection action of the PC to the network can be recognized. Since the management server 2 always monitors the network, it detects unique address data flowing through the network upon connection, and compares the unique address data with unique address data registered in the management table 204d.

If it is determined as a result of comparison that no unique address data has been registered, the server 2 causes the domain server 4 and file server 10 to inhibit acceptance from the added PC in order to inhibit access by the PC to the network 1. This can be implemented by, e.g., preparing a step of inhibiting reception from the added PC for the driver programs of network interfaces in the servers 4 and 10.

Note that another identification data other than address data may be detected to detect a network configuration error.

As described above, there can be provided a network system with high reliability which can directly determine and process a change of data flowing through a network, and quickly detect and deal with an abnormal state of the network environment.

In this case, the administrator can also initially register and change necessary unique address data by using the keyboard of the server 2 or the like, increasing the degree of freedom of handling.

Second Embodiment

In the first embodiment, when a change of the configuration exceeding initial permissible configuration information occurs in a given client PC, the client PC is shut down. To the contrary, an example in which the use of the client PC is not inhibited upon a change of the configuration, i.e., a local process is permitted but the use of a network is inhibited will be explained as the second embodiment.

The configurations of a network, network management server, and client PC are the same as those shown in FIGS. 1 to 4.

In the second embodiment, some functions are added to the driver program of a network interface 409 in a client PC 7 (also in client PCs 8 and 9). The process contents of the driver program of the network interface 409 according to the second embodiment will be explained with reference to the flowchart of FIG. 9.

Figure 9:
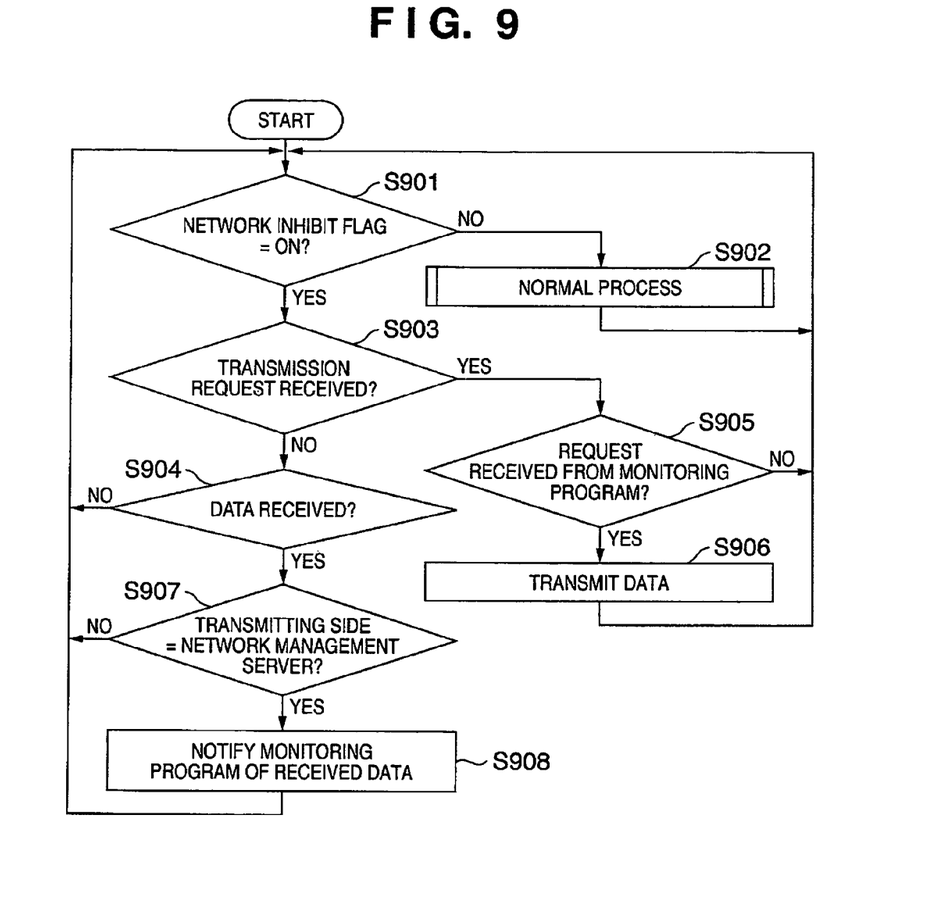
FIG. 9 is a flowchart showing the process sequence of the driver program of a network interface according to the second embodiment.

In step S901, it is determined whether a network inhibit flag (ensured in a RAM 403) is ON. If the network inhibit flag is OFF, the flow advances to step S902 to perform a normal communication (transmission and reception) process with a network in order to permit normal network access.

If the network inhibit flag is ON, it is determined in steps S903 and S904 whether a transmission request from a host process has been received or data addressed to the client PC has been received from a network 1.

If it is determined that a transmission request has been received, the flow advances to step S905 to determine whether the transmission-requesting application is a monitoring program 404c. This determination is based on whether predetermined data is contained in communication with the monitoring program. Only if it is determined that the monitoring program 404c has issued the request, the flow advances to step S906 to transmit data to a network management server.

If data has been received from the network, the flow advances from step S904 to step S907 to determine whether the transmitting side is a network management server 2. This determination may be based on whether a network address contained in the received frame represents the network management server 2. Only if data has been received from the network management server 2, the flow advances to step S908 to notify the monitoring program 404c of the received data.

As a result, if the network inhibit flag is set ON, only transmission to the network management server 2 (transmission in response to a transmission request from the monitoring program 404c) and reception from the network management server 2 (reception process by the monitoring program 404c) function. Another access by the application to the network is cut off.

Note that the process in step S902 can be regarded as a general network driver. In this case, the process in FIG. 9 can be regarded as a program which is positioned above the general network driver in the layers.

Figure 10:
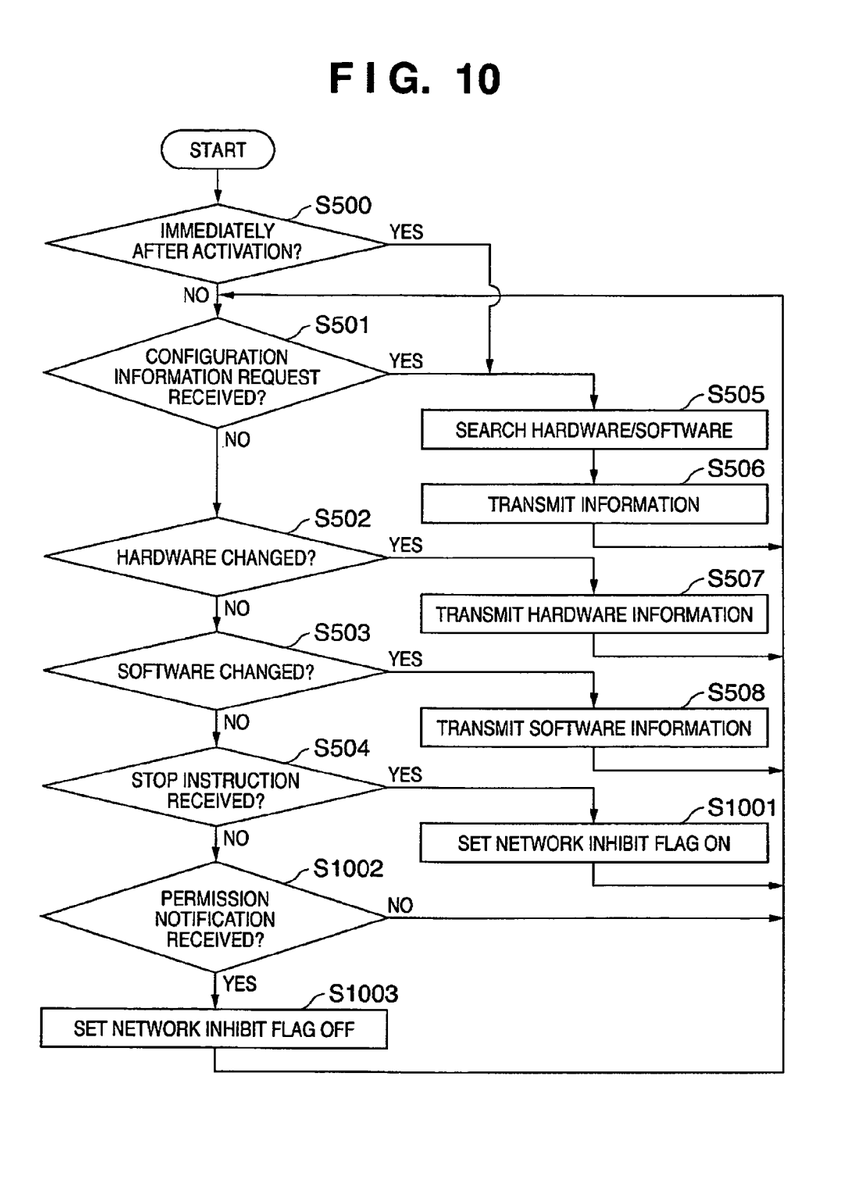
FIG. 10 is a flowchart showing the process sequence of a monitoring program which runs on a client PC.

The process contents of the monitoring program 404c which runs on a client PC according to the second embodiment will be explained with reference to the flowchart of FIG. 10.

Steps S500 to S508 are the same as those in FIG. 5, the same reference numerals denote the same processes, and a description thereof will be omitted.

If a stop instruction is received from the network management server 2 in step S504, the network inhibit flag is set ON in step S1001. This means that the user is inhibited from accessing a network after a new application exceeding the permissible range is installed in the client PC or a device exceeding the permissible range is connected to an external storage interface 410. At this time, a message representing the reason of inhibition may be displayed on the client PC.

In step S1002, it is determined whether a permission notification has been received from the network management server 2. If it is determined that a permission notification has been received (corresponding to a case wherein step S808 in FIG. 8 is executed), the network inhibit flag is set OFF in step S1003.

As described above, when the use of the network is inhibited owing to device connection or an installed application, and the device is disconnected or the application is uninstalled, the network management server 2 is notified of configuration information after execution of the process. The configuration information coincides with initial permissible configuration information, and as a result a permission notification is received. In this case, the process in step S1003 is executed, and network access is enabled again even by a general application or the like.

The first and second embodiments have been described. When a hardware or software change exceeding an initial permissible configuration occurs, a client PC changes to a stall state such that power stops or the use of a network is inhibited, thereby suppressing leakage of information. A client PC cannot be utilized while an application which is irrelevant to business or may make the system unstable is kept installed. Hence, such an unknown application is hardly installed, and stable operation of the client PC can be expected.

Note that stall targets are a power supply and network in the embodiments, but are not limited to them as far as write in an external device can be suppressed in terms of at least hardware.

The embodiments have exemplified a USB as an external storage interface. However, the external storage interface is not limited to the USB but can be another interface, and the present invention is not limited to the USB.

In the embodiments, when the configuration of a terminal changes, the function of the terminal is stopped. Alternatively, the administrator or the like may be notified of the change, or the change may be recorded as the use status of the terminal. Also, the process may be changed in accordance with the content of a configuration change such that the function is stopped upon connection of a new terminal or external device, but only a notification or recording is done upon installation of an application or the user of the terminal is requested to uninstall the application.

The features of the embodiments can be implemented by an application which runs on a general personal computer (client PC or network management server), except for the stall program which is stored in the ROM 202 according to the first embodiment. The computer program, therefore, falls within the scope of the present invention. In general, the computer program can be executed by setting a computer-readable storage medium such as a CD-ROM in a computer, and copying or installing the program into the system. Hence, the computer-readable storage medium also falls within the scope of the present invention.

As has been described above, according to the present invention, when an abnormal change occurs in a network, for example, when an improper element is added to the network, the change can be detected.

According to another invention, a function which makes a network terminal or system unstable can be stopped, and stable operation of the terminal or system can be expected.

According to still another invention, for example, a predetermined function of a client terminal can be stopped to suppress leakage of information using the function.

According to still another invention, the burden on the network administrator can be reduced.

According to still another invention, when a problem occurs in a building element of the network, the element can be quickly, reliably dealt with (e.g., powered off).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-325592 filed on Nov. 9, 2004, which is hereby incorporated by reference herein.

What is claimed is:

1. A network management apparatus for managing a plurality of terminals connected to a local area network, said network management apparatus comprising:
at least a processor and memory, which cooperate to:
store an administration table in which a plurality of fields corresponding to the plurality of the terminals is allocated, where a field corresponding to a terminal stores permission information identifying a storage device permitted for use on the terminal;
acquire, from a terminal among the plurality of terminals, current device configuration information identifying a storage device being connected to the terminal, the acquiring being executed repeatedly for each of the plurality of terminals;
compare the acquired current device configuration information with the permission information stored in the corresponding field in the administration table, and determine, based on the result of the comparison, whether the terminal is being connected to a storage device other than a storage device permitted for use for the terminal, the comparison being executed in response to the acquisition for each of the plurality of terminals when there is a storage device which is identified in the acquired current device configuration information; and
when the result of the comparison indicates that the terminal is being connected to a storage device not permitted for use, transmit to the terminal a power-off instruction, a network access inhibition instruction, or a restriction instruction to restrict writing to the storage device not permitted for use,
wherein said network management apparatus performs the acquiring and the transmitting via the local area network.

2. A management server which manages a plurality of terminals connected to a local area network, comprising:
a memory that stores an administration table in which a plurality of fields corresponding to the plurality of terminals is allocated, where a field corresponding to a terminal stores permission information identifying a device permitted for use on the terminal;
a first acquisition unit that acquires, from a terminal among the plurality of terminals via the network, first device information identifying a device that is being connected to the terminal, and registers the acquired first device information as the permission information into a corresponding field in the administration table stored in said memory, where the acquisition by said first acquisition unit is executed once for the terminal when the terminal is to be managed at an initial stage by said management server for each of the plurality of terminals;
a second acquisition unit that acquires, from a terminal among the plurality of terminals, second device information identifying a device that is being connected to that terminal after the registration for the terminal by said first acquisition unit has been made, while said management server is managing the terminal, the acquiring being executed repeatedly for each of the terminals;
a determination unit that compares the second device information acquired by said second acquisition unit with the permission information in the corresponding field in the administration table stored in said memory, and that determines, based on the result of the comparison, that the terminal is being connected to a device not permitted for use on that terminal when there is a device which is identified in the second device information, the comparison and the determination being performed repeatedly for each of the plurality of terminals; and
a transmitter that, when the result of the determination indicates that the terminal is connected to a device not permitted for use, transmits to the terminal a power-off instruction, a network access inhibition instruction, or a restriction instruction to restrict writing to any device,
wherein said management server performs the acquiring and the transmitting via the local area network.

3. The server according to claim 2, wherein the power-off instruction includes an instruction to a BIOS of the terminal.

4. The server according to claim 2, wherein said second acquisition unit acquires the second device information upon respective activation of each of the terminals.

5. The server according to claim 2, wherein said second acquisition unit acquires the second device information upon respective connection of each of the terminals to an external device.

6. The server according to claim 2, wherein said second acquisition unit acquires the second device information of each of the terminals at predetermined time intervals.

7. A network control method performed by a network management apparatus for managing a plurality of terminals connected to a local area network, the method comprising steps of:
storing an administration table in which a plurality of fields corresponding to the plurality of terminals is allocated, where a field corresponding to a terminal stores permission information identifying a storage device permitted for use on the terminal;
acquiring, from a terminal among the plurality of terminals, current device configuration information identifying a storage device being connected to the terminal, the acquiring being executed repeatedly for each of the plurality of terminals;
comparing the current device configuration information acquired in said acquiring step with the permission information in the corresponding field in the administration table stored in said storing step, and determining, based on the result of the comparison, whether the terminal is being connected to a storage device other than a corresponding storage device permitted for use for the terminal when there is a storage device which is identified in the current device configuration information; and when determined in said determining step that the terminal is being connected to a storage device not permitted for use, transmitting to the terminal a power-off instruction, a network access inhibition instruction, or a restriction instruction to restrict writing to the storage device not permitted for use, wherein the network management apparatus is coupled to the plurality of terminals by the local area network.

8. A method of controlling a management server which manages a plurality of terminals connected to a local area network, comprising steps of:

storing an administration table in which a plurality of fields corresponding to the plurality of terminals is allocated, where a field corresponding to a terminal stores permission information identifying a device permitted for use on the terminal;

acquiring first, from a terminal among the plurality of terminals via the network, first device information identifying a device that is being connected to the terminal, and registering the acquired first device information as the permission information into a corresponding field in the administration table stored in said storing step, where the acquisition in said first acquiring step is executed once for the terminal when the terminal is to be managed at an initial stage by the management server for each of the plurality of terminals;

acquiring second, from a terminal among the plurality of terminals, second device information identifying a device that is being connected to the terminal after the registration for the terminal in said first acquiring step has been made, while the management server is managing the terminal, said second acquiring step being executed repeatedly for each of the plurality of terminals;

comparing the second device information acquired in said second acquiring step with the permission information in the corresponding field in the administration table stored in said storing step, and determining, based on the result of the comparison, whether the terminal is being connected to a device not permitted for use on the terminal when there is a device which is identified in the second device information, the comparison and the determination is executed in response to the acquisition by said second acquisition step for each of the plurality of terminals; and when determined in said determining step that the terminal is being connected to a device not permitted for use, transmitting to the terminal a power-off instruction, a network access inhibition instruction, or a restriction instruction to restrict writing to any device, wherein the method is performed by the management server, and wherein the management server is connected to the plurality of terminals by the local area network.

9. A non-transitory computer-readable memory storing a computer program which is loaded and executed by a computer for managing a plurality of terminals, the program comprising steps of:

storing an administration table in a plurality of fields corresponding to the plurality of terminals is allocated, where a field corresponding to a terminal stores permission information identifying a storage device permitted for use on the terminal;

acquiring, from a terminal among the plurality of terminals, current device configuration information identifying a storage device being connected to the terminal, the acquiring being executed repeatedly for each of the plurality of terminals;

comparing the current device configuration information acquired in said acquiring step with the permission information in the corresponding field in the administration table stored in said storing step, and determining, based on the result of the comparison, whether the terminal is being connected to a storage device other than a corresponding storage device permitted for use for the terminal when there is a storage device which is identified in the current device configuration information, the comparison and the determination being executed in response to the acquisition for each of the plurality of terminals; and when determined in said determining step that the terminal is being connected to a storage device not permitted for use, transmitting to the terminal a power-off instruction, a network access inhibition instruction, or a restriction instruction to restrict writing to the storage device not permitted for use, wherein the network management apparatus is coupled to the plurality of terminals by the local area network.

10. A non-transitory computer-readable memory storing a computer program which is loaded and executed by a computer and functions as a management server for managing a plurality of terminals connected to a local area network, the computer program comprising steps of:

storing an administration table in which a plurality of fields corresponding to the plurality of terminals is allocated, where a field corresponding to a terminal stores permission information identifying a device permitted for use on the terminal;

acquiring first, from a terminal among the plurality of terminals via the network, first device information identifying a device that is being connected to the terminal and, registering the acquired first device information as the permission information into a corresponding field in the administration table stored in said storing step, where the acquisition in said first acquiring step is executed once for the terminal when the terminal is to be managed at an initial stage by the management server for each of the plurality of terminals;

acquiring second, from a terminal among the plurality of terminals, second device information identifying a device that is being connected to the terminal after the registration for the terminal in said first acquiring step has been made, while the management server is managing the terminal, said second acquiring step being executed repeatedly for each of the plurality of terminals;

comparing the second device information acquired in said second acquiring step with the permission information in the corresponding field in the administration table stored in said storing step, and determining, based on the result of the comparison, whether the terminal is being connected to a device not permitted for use on the terminal when there is a device which is identified in the second device information; and when determined in said determining step that the terminal is being connected to a device not permitted for use, transmitting to the terminal a power-off instruction, a network access inhibition instruction, or a restriction instruction to restrict writing to any device, wherein the computer is connected to the plurality of terminals by the local area network.

11. A network management system comprising:

a plurality of client terminals connected to a local area network; and a management server connected to said plurality of client terminals by the local area network for managing each of said plurality of client terminals, wherein each of said client terminals includes:

a detector that detects a device being currently connected to the client terminal and generates device information identifying the detected device; and a transmitter that transmits the device information of the client terminal to said management server, wherein said management server includes:

a memory that stores an administration table in which a plurality of fields corresponding to the plurality of client terminals is allocated, where a field corresponding to a client terminal stores permission information identifying a device permitted for use on the client terminal;

a first receiver that receives, from a client terminal among the plurality of client terminals, first device information identifying a device that is being connected to that client terminal, and registers the first device information as the permission information into a corresponding field in the administration table stored in said memory, where the reception by said first receiver is executed once for said client terminal when said client terminal is managed at an initial stage by said management server for each of the plurality of client terminals;

a second receiver that receives, from a client terminal among the plurality of client terminals, second device information identifying a device that is being connected to that client terminal after the registration for the client terminal has been made, where the reception by said second receiver is executed repeatedly for the client terminal while said management server is managing the client terminal for each of the plurality of client terminals;

a determination unit that compares the second device information received by said second receiver with the permission information in the corresponding field in the administration table stored in said memory and that determines based on the result of the comparison, that the client terminal is being connected to a device not permitted for use when there is a device which is identified in the second device information; and a transmitter that, when determined that the client terminal is being connected to the device not permitted for use, transmits a power-off instruction, a network access inhibition instruction, or a restriction instruction to restrict writing to any storage device to the client terminal.

* * * * *